UNITED STATES PATENT OFFICE.

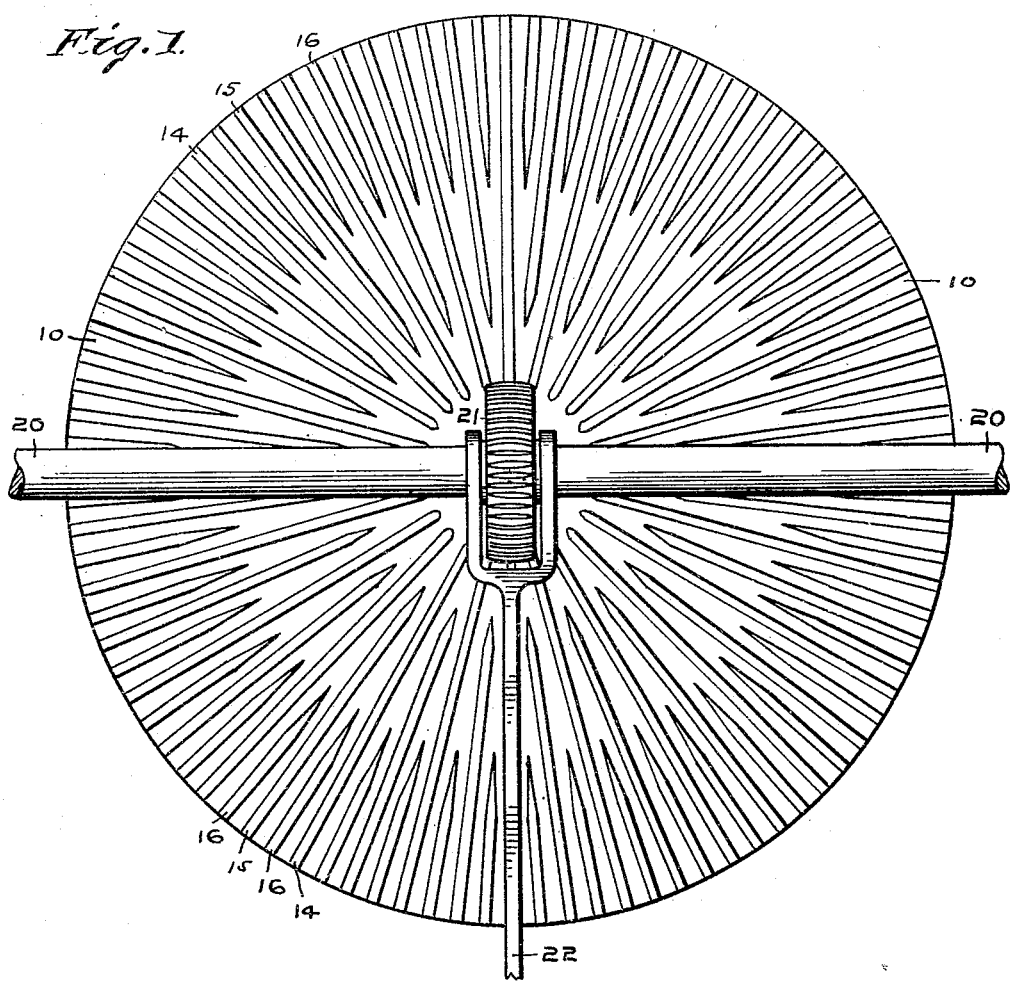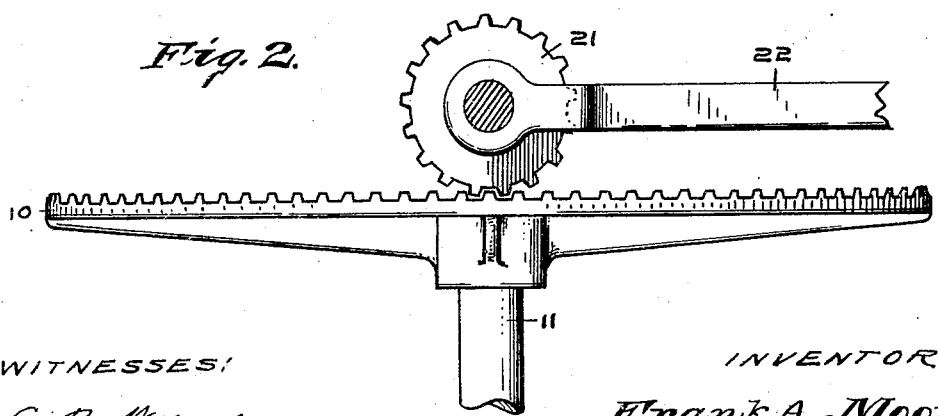

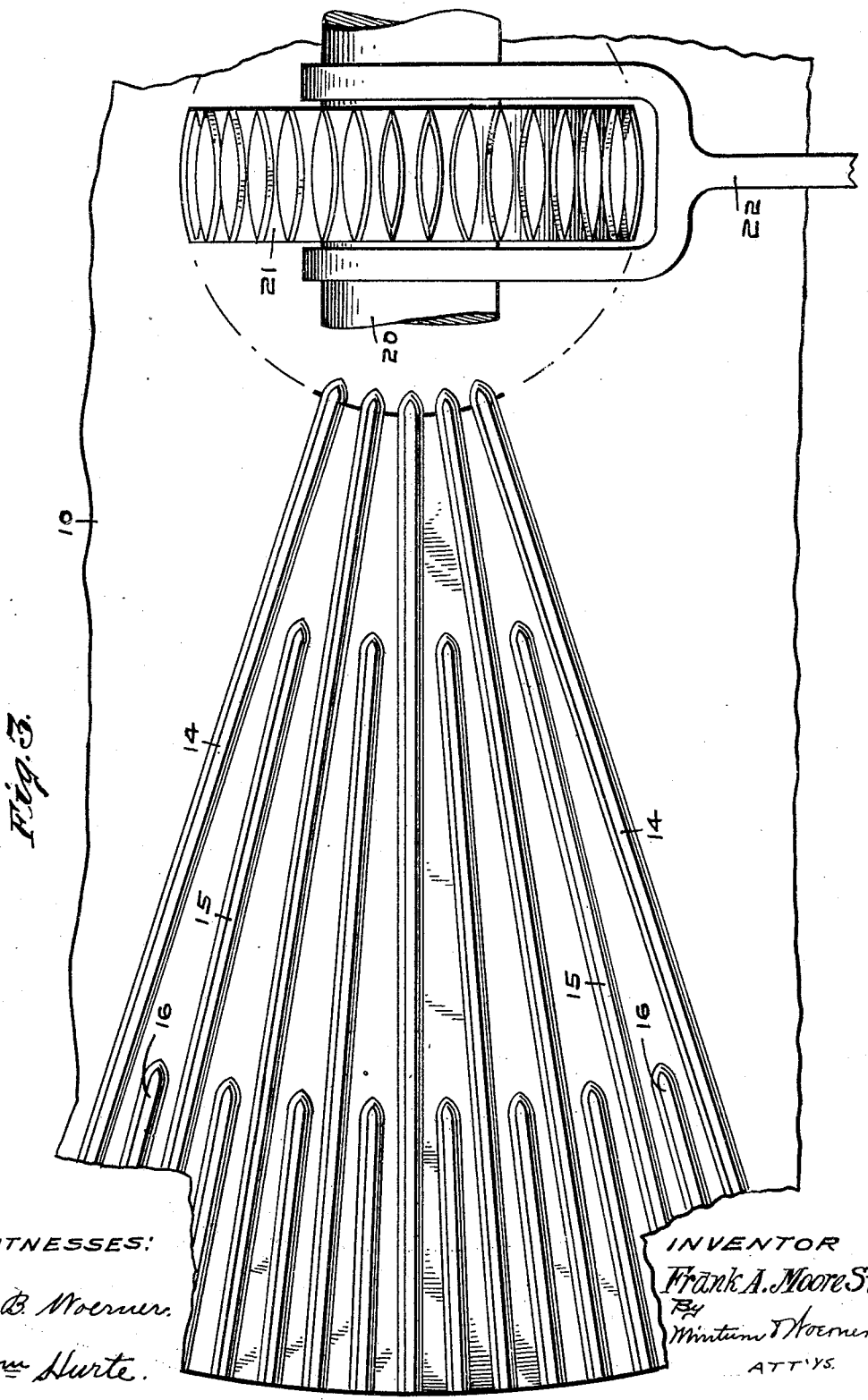

FRANK A. MOORE, SR., OF INDIANAPOLIS, INDIANA, ASSIGNOR OF ONE-FOURTH TO FRANK A. MOORE, JR., OF INDIANAPOLIS, INDIANA.

VARIABLE-SPEED TRANSMISSION DEVICE.

955,279.

Specification of Letters Patent. Patented Apr. 19, 1910.

Application filed October 27, 1909. Serial No. 524,934.

*To all whom it may concern:*

Be it known that I, FRANK A. MOORE, Sr., a citizen of the United States, residing at Indianapolis, in the county of Marion and State of Indiana, have invented certain new and useful Improvements in Variable-Speed Transmission Devices, of which the following is a specification.

This invention relates to a variable speed transmission device of a type employing a disk wheel provided on its flat surface with radially extending teeth of different lengths and, also, a pinion adapted to move across the face of said disk wheel—from its axis to its edge—and engage with the teeth thereon.

The object of the invention is to provide a device of the above character wherein different rates of speed can be secured and maintained, and by eliminating the element of slippage, as now obtains in devices having smooth frictional contact faces, the efficiency of the device herein described for transmitting power is correspondingly increased.

I accomplish the object of my invention by means of the device illustrated in the accompanying drawing, forming a part hereof, in which—

Figure 1 is a front elevation of the toothed disk showing the engagement pinion in end elevation. Fig. 2 is an edge elevation of the device. Fig. 3 is a fragmentary detail plan view of the disk wheel and pinion, on an enlarged scale, so as to show more accurately the formation of the teeth in both said disk wheel and pinion.

In the drawings, 10 represents the main body of the disk wheel which is mounted on a suitable drive shaft 11. One of the flat surfaces of the disk wheel 10 is provided with a plurality of teeth, which teeth are arranged in series of different lengths, namely, the longest teeth being represented at 14, the next longest at 15 and the shortest teeth at 16, all these teeth being uniformly spaced and arranged radially around the axis of said disk wheel. Mounted in a plane parallel with the toothed surface of the disk wheel 10 is the shaft 20. A pinion 21 is feathered on said shaft 20 to permit the pinion to move longitudinally on said shaft to either side of the axis of said wheel 10.

It will be noted, by examining Fig. 1 of the drawings, that the teeth 14 do not extend entirely to the axis of the disk wheel 10 but terminate at a uniform distance therefrom, so that the central portion of the surface of said disk wheel is free of obstructions and into which the pinion 10 may be moved so as to be out of engagement with said disk wheel. When the pinion 21 is standing at the axis of the disk wheel it occupies a neutral position and is not rotated by said disk wheel 10. The pinion 21, as before stated, may be moved longitudinally along the shaft 20 so as to make engagement and rotate the disk wheel 10, and this shifting may be accomplished by any suitable shifting-means, such for instance, as the shipper 22. When the pinion 21 is initially moved into engagement with the disk wheel 10, the engagement involves the teeth 14 which terminate at a point where their centers are spaced a distance apart that correspond to the spacing of the teeth on the pinion 21. After the pinion 21 is set into motion the latter may be still farther shifted toward the edge of the disk wheel.

As the center lines of the teeth on the disk wheel 10 diverge it becomes apparent that intermediate teeth must be provided and these comprise the teeth 15 which terminate at points where the distances each way, circumferentially, to the centers of the adjacent teeth 14 correspond to the distance between the inner terminal ends of the teeth 14. And further, as the distance of the disk wheel 10 increases from it axis, which also increases the distance between the teeth 14 and 15 on account of their radial arrangement upon the face of the disk wheel, it is apparent that more teeth must be provided and these are indicated at 16. The teeth 16 terminate at a point where the distance each way to the centers of the adjacent teeth 14 and 15 corresponds to the distance between the inner terminal ends of the teeth 14. The termination of these different sets of teeth occurs at points so as to maintain a uniform distance between their centers, and all these distances correspond to the arrangement of the teeth on the pinion 21, so that proper registration with said pinion can be made. It will be noted that the periphery of the pinion 21 is provided with teeth and is formed on a curve in cross section so that the center of the teeth will be farthest away from the axis of the pinion, thereby limiting their engagement with the disk wheel 10 to the central portion of said teeth. The teeth on the pinion are also pointed at the ends so that registration between the pinion 21 and disk wheel 10 may easily be effected, and by the curved formations of the sides of said teeth the friction between the pinion and disk wheel is reduced. As before stated, forming the periphery of the pinion on a curve in cross section reduces the area of the teeth extending between the teeth on the disk wheel 10. This construction renders the teeth on the pinion less liable to interfere with the teeth on the disk wheel 10 when the pinion is moved in a straight line across the face of said disk wheel. During the operation of shifting the pinion 21 from the inner terminal ends of the teeth 14 to the similar ends of the teeth 15 one of the engaging teeth on the disk wheel will be released leaving one of the spaces in the pinion 21 free and in position to mesh with the adjacent intermediate tooth 15 when the pinion reaches the inner ends of the latter teeth. When the pinion 21 is moved farther away from the axis of the disk wheel the operation of releasing a tooth is repeated so that a tooth 16 may be picked up by said pinion. It may be mentioned that the shifting of the pinion 21 across the face of the disk wheel is more readily accomplished when the two are in motion.

While the device retains the same characteristics as the smooth frictional contact faces in other transmission devices—changing both the rate of speed and direction of movement as the pinion 21 is moved outward from the axis of the disk wheel 10—the slippage so common to those devices is in this device prevented, so that a uniform movement of rotation is secured.

Having thus fully described my said invention, what I desire to secure by Letters Patent, is—

1. In a variable speed transmission device, the combination of a rotatable disk wheel having on one face a plurality of teeth arranged in sets, the teeth comprising each set being of uniform length, but varying in length from the teeth in the other sets, and all the teeth being uniformly spaced and radially arranged around the axis of said disk wheel, a pinion arranged at right angles to the disk wheel and adapted to make engagement therewith, and means for shifting said pinion across the face of said disk wheel.

2. In a variable speed transmission device, the combination of a rotatable disk wheel having on one face a plurality of teeth arranged in sets, the teeth comprising each set being of uniform length, but varying in length from the teeth in the other sets, and all the teeth being uniformly spaced and radially arranged around the axis of said disk wheel, a pinion having its periphery cut on a curve in cross section adapted to reduce the area of the teeth's engagement with the disk wheel, and means for shifting said pinion across the face of said disk wheel to change both the direction of travel and rate of speed of the pinion.

3. In a variable speed transmission device, the combination of a rotatable disk wheel having on one face a plurality of teeth arranged in sets, the teeth comprising each set being of uniform length, but varying in length from the teeth in the other sets, and all the teeth being uniformly spaced and radially arranged around the axis of said disk wheel, a pinion having its teeth pointed at both ends and having the surfaces of said teeth cut on a curve to reduce their area of engagement with the disk wheel, and means for shifting said pinion across the face of said disk.

In witness whereof, I have hereunto set my hand and seal at Indianapolis, Indiana, this, 21st day of October, A. D. one thousand nine hundred and nine.

FRANK A. MOORE, Sr. [L. S.]

Witnesses:
F. W. WOERNER,
L. B. WOERNER.